(12) United States Patent
Falconer

(10) Patent No.: US 10,428,290 B2
(45) Date of Patent: Oct. 1, 2019

(54) DE-ICING LUBRICANT COMPOSITION

(71) Applicant: Dustin Falconer, Grande Prairie (CA)

(72) Inventor: Dustin Falconer, Grande Prairie (CA)

( * ) Notice: Subject to any disclaimer, the term of this patent is extended or adjusted under 35 U.S.C. 154(b) by 368 days.

(21) Appl. No.: 15/367,316

(22) Filed: Dec. 2, 2016

(65) Prior Publication Data

US 2017/0158979 A1 Jun. 8, 2017

Related U.S. Application Data

(60) Provisional application No. 62/263,039, filed on Dec. 4, 2015.

(51) Int. Cl.
*C10M 101/02* (2006.01)
*C09K 3/18* (2006.01)
*C10M 105/12* (2006.01)

(52) U.S. Cl.
CPC ........... *C10M 101/02* (2013.01); *C09K 3/185* (2013.01); *C10M 105/12* (2013.01); *C10M 2203/003* (2013.01); *C10M 2207/0203* (2013.01); *C10N 2230/20* (2013.01); *C10N 2250/04* (2013.01)

(58) Field of Classification Search
CPC ... C09K 3/185; C10M 101/02; C10M 105/12; C10M 2207/0203; C10M 2203/003; C10N 2250/04; C10N 2230/20
See application file for complete search history.

(56) References Cited

U.S. PATENT DOCUMENTS

| | | |
|---|---|---|
| 3,711,409 A | 1/1973 | Ayres |
| 3,770,633 A | 11/1973 | Holley |
| 4,358,389 A | 11/1982 | Konig-Lumer et al. |
| 5,759,436 A | 6/1998 | Schrimpf et al. |
| 5,772,912 A | 6/1998 | Lockyer et al. |
| 5,853,610 A | 12/1998 | Kaes |
| 5,993,684 A | 11/1999 | Back et al. |
| 6,156,226 A | 12/2000 | Klyosov et al. |
| 6,299,793 B1 | 10/2001 | Hartley et al. |
| 6,372,842 B1 | 4/2002 | Grisso et al. |
| 7,632,421 B2 | 12/2009 | Bytnar |
| 7,972,530 B2 | 7/2011 | Wehner et al. |
| 2009/0218541 A1* | 9/2009 | Wehner .................... A61Q 5/02 252/70 |
| 2012/0193569 A1 | 8/2012 | Koefod et al. |

* cited by examiner

*Primary Examiner* — Taiwo Oladapo

(57) ABSTRACT

A de-icing lubricant composition is provided, including isopropyl alcohol; and mineral oil. The isopropyl alcohol may be 60-90% of the composition by weight. The mineral oil may be 10-30% of the composition by weight. The composition may include a dye and/or a propellant. The propellant may be $CO_2$. A method of restoring mobility to frozen components is also provided by applying a composition as described above to a frozen component.

15 Claims, No Drawings

DE-ICING LUBRICANT COMPOSITION

CROSS-REFERENCE TO RELATED APPLICATIONS

This application claims priority to U.S. Provisional Application No. 62/263,039, entitled "De-Icing Lubricant Composition," filed Dec. 4, 2015, and Canadian Patent Application No. 2,913,906, entitled "De-Icing Lubricant Composition," filed Dec. 3, 2015, and incorporated herein by reference in their entireties.

FIELD OF THE INVENTION

This invention relates to lubricants, and more particularly to lubricants for use in cold temperatures.

BACKGROUND OF THE INVENTION

Machinery and other objects with moving components may find those components held stationary due to moisture that freezes in or on the components. Typically a two-step method is used to free the components, first using a tool or other means to remove the ice, and then to apply a lubricant.

SUMMARY OF THE INVENTION

Rather than using unsafe or dangerous methods to de-ice a part or component, the composition according to the invention may be used to remove the freezing attributes of ice and frozen condensation from components and allow a residual penetrant and lubricant to remain on the moving components to assist in regaining movement. The composition according to the invention both de-ices and lubricates frozen components and machinery.

A de-icing lubricant composition is provided, including isopropyl alcohol; and mineral oil. The isopropyl alcohol may be 60-90% of the composition by weight. The mineral oil may be 10-30% of the composition by weight. The composition may include a dye and/or a propellant. The propellant may be $CO_2$.

The isopropyl alcohol may be 70-85% of the composition by weight or 80% of the composition by weight. The mineral oil may be 12-20% of the composition by weight or 15% of the composition by weight.

The mineral oil may be a mixture of severely hydrotreated and hydrocracked base oil or may be raw paraffinic mineral oil. The de-icing composition may be placed in an aerosol can or a manual pump spray apparatus. The dye may be blue.

A method of restoring mobility to frozen components is provided, applying a composition as described above to a frozen component.

DESCRIPTION OF THE INVENTION

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

An embodiment of a composition according to the invention includes isopropyl alcohol and mineral oil, and optionally, a dye and/or a propellant, such as $CO_2$.

The isopropyl alcohol, also known as isopropanol, in an embodiment of the invention, is 60-90% of the composition by weight. In an alternative embodiment of the invention the isopropyl alcohol is 70-85% of the composition by weight. In yet another alternative embodiment of the invention is isopropyl alcohol is 80% of the composition by weight.

The mineral oil, in an embodiment of the invention, is 10-30% of the composition by weight. Alternatively, the mineral oil is 12-20% of the composition by weight. In yet another alternative embodiment of the invention, the mineral oil is 15% of the composition by weight.

The mineral oil may be a mixture of severely hydrotreated and/or hydrocracked base oil. The base oil may include any of the oils described under CAS numbers: 8042-47-5; 64742-46-7; 64742-47-8; 64742-53-6; 64742-54-7; 64742-55-8; 72623-84-8; 72623-85-9; 72623-86-0; 72623-87-1; 178603-64-0; 178603-65-1; 178603-66-2; and 445411-73-4 or a combination thereof. In an embodiment of the invention the mineral oil may be paraffinic.

The composition may include $CO_2$ as a propellant for an aerosol can in which the composition is stored. The $CO_2$ is 1-5% of the composition by weight, but in an alternative embodiment, may be 3%. Alternative propellants to $CO_2$ may be used, including volatile hydrocarbons, such as propane, n-butane and isobutanol; dimethyl ether (DME) and methyl ethyl ether; nitrous oxide; hydrofluoroalkanes (HFA) (either HFA 134a (1,1,1,2,-tetrafluoroethane) or HFA 227 (1,1,1,2,3,3,3-heptafluoropropane)); or combinations of the above. Alternatively a manual pump spray can be used as an alternative to an aerosol can requiring a propellant.

Dye may be added to the composition (at less than 1% of the composition by volume) for visual effect. The dye may be blue, but other colours could be used.

The isopropyl alcohol and mineral oil are miscible, so when the isopropyl alcohol melts the ice, the mineral oil is residual on the components being treated. The mineral oil may be non-streaking.

In use the composition is sprayed or otherwise applied, such as topically, to frozen components and equipment, allowing the de-icing properties of the composition to work. The residual lubricant is left on the components and helps the components regain motion.

The composition provides the capacity to achieve lubrication after de-icing is achieved. The composition is effective for de-icing and lubrication of coupling connections, pipe joints, ratcheting load binders, nuts and bolts, hydraulic fittings, electrical connections, seals, frozen tailgates, hood latches and throttle cables. The composition has excellent creep properties and is able to work into problematic areas that are seized, removing ice and allowing the mineral oil to creep into the areas and surfaces in order to re-gain motion.

The composition can be used for frost removal in cases where lubrication is not needed, for example windshields, by using a non-streaking mineral oil.

The above-described embodiments have been provided as examples, for clarity in understanding the invention. The filter according to the invention may be operated manually or electronically. A person with skill in the art will recognize that alterations, modifications and variations may be effected to the embodiments described above while remaining within the scope of the invention as defined by claims appended hereto.

The invention claimed is:

1. A de-icing lubricant composition, comprising:
   a. isopropyl alcohol comprising 60-90% of the composition by weight; and
   b. mineral oil.

2. The de-icing lubricant composition of claim 1, where the mineral oil comprises 10-30% of the composition by weight.

3. The de-icing lubricant composition of claim 1, further comprising a dye.

4. The de-icing lubricant composition of claim 1, further comprising a propellant.

5. The de-icing lubricant composition of claim 4 wherein the propellant is $CO_2$.

6. The de-icing lubricant composition of claim 1 wherein the isopropyl alcohol is 70-85% of the composition by weight.

7. The de-icing lubricant composition of claim 6 wherein the isopropyl alcohol is 80% of the composition by weight.

8. The de-icing lubricant composition of claim 2 wherein the mineral oil is 12-20% of the composition by weight.

9. The de-icing lubricant composition of claim 8 wherein the mineral oil is 15% of the composition by weight.

10. The de-icing lubricant composition of claim 1 wherein the mineral oil is a mixture of severely hydrotreated and/or hydrocracked base oil.

11. The de-icing lubricant of claim 1 wherein the mineral oil is raw paraffinic mineral oil.

12. The de-icing lubricant composition of claim 5 wherein the composition is placed in an aerosol can.

13. The de-icing lubricant composition of claim 1 wherein the composition is stored in a manual pump spray apparatus.

14. The do-icing lubricant composition of claim 3, wherein the dye is blue.

15. A method of restoring mobility to frozen components, comprising applying the de-icing lubricant composition of claim 1 to a frozen component.

* * * * *